(12) United States Patent
Luo et al.

(10) Patent No.: US 8,183,491 B2
(45) Date of Patent: May 22, 2012

(54) ELECTRIC DISCHARGE MACHINING DEVICE USING ROTATING CIRCULAR BLADE

(75) Inventors: Yuefeng Luo, Mechanicville, NY (US); William Edward Adis, Scotia, NY (US)

(73) Assignee: General Electric Company, Schenectady, NY (US)

( * ) Notice: Subject to any disclaimer, the term of this patent is extended or adjusted under 35 U.S.C. 154(b) by 228 days.

(21) Appl. No.: 12/471,683

(22) Filed: May 26, 2009

(65) Prior Publication Data
US 2010/0301016 A1  Dec. 2, 2010

(51) Int. Cl.
*B23H 1/00* (2006.01)
(52) U.S. Cl. .................. 219/69.11; 219/69.15; 219/69.2
(58) Field of Classification Search ............... 219/69.11, 219/69.2, 69.15, 69.16
See application file for complete search history.

(56) References Cited

U.S. PATENT DOCUMENTS

| | | | | |
|---|---|---|---|---|
| 1,701,919 A | * | 2/1929 | Grumpelt | 219/69.2 |
| 2,815,435 A | * | 12/1957 | Adcock | 219/69.2 |
| 2,818,491 A | * | 12/1957 | Matulaitis | 219/69.16 |
| 3,338,808 A | * | 8/1967 | Johnson | 219/69.2 |
| 3,624,336 A | * | 11/1971 | Martinez | 219/69.2 |
| 3,663,787 A | * | 5/1972 | Haswell et al. | 219/69.2 |
| 3,764,771 A | | 10/1973 | Roy | |
| 4,046,984 A | * | 9/1977 | Vial | 219/69.15 |
| 4,365,133 A | * | 12/1982 | Inoue | 219/69.17 |
| 4,510,368 A | * | 4/1985 | Schlienger et al. | 219/69.17 |
| 4,547,646 A | | 10/1985 | Briffod | |
| 4,628,171 A | | 12/1986 | Colby et al. | |
| 5,049,715 A | | 9/1991 | Tanaka | |
| 5,326,954 A | | 7/1994 | Lenard et al. | |
| 5,561,336 A | | 10/1996 | Girardin | |
| 5,589,086 A | * | 12/1996 | Sawada et al. | 219/69.16 |
| 6,184,486 B1 | | 2/2001 | Diot et al. | |
| 6,566,623 B2 | | 5/2003 | McPhillips | |
| 6,781,082 B1 | | 8/2004 | Osborne | |
| 6,897,400 B1 | | 5/2005 | Yuan et al. | |
| 2002/0162824 A1 | * | 11/2002 | Tricarico et al. | 219/69.17 |
| 2002/0179572 A1 | | 12/2002 | McPhillips | |
| 2003/0024825 A1 | | 2/2003 | Lamphere et al. | |
| 2004/0011768 A1 | * | 1/2004 | Beaumont | 219/69.16 |

FOREIGN PATENT DOCUMENTS

| | | |
|---|---|---|
| EP | 0538434 A1 | 4/1993 |
| EP | 0555818 A1 | 8/1993 |
| EP | 0639420 A1 | 2/1995 |
| EP | 0639421 A1 | 2/1995 |
| EP | 1579941 A2 | 9/2005 |
| EP | 1579941 A3 | 9/2005 |
| JP | 62-40973 A * | 2/1987 |
| JP | 3-166019 A * | 7/1991 |
| JP | 10-43952 A * | 2/1998 |
| JP | 2005-66760 A * | 3/2005 |
| WO | 0166294 A1 | 9/2001 |

OTHER PUBLICATIONS

Haegeman, Marc, Application No. EP 10162852, "Partial European Search Report," Mar. 23, 2012, 6 pages.

* cited by examiner

*Primary Examiner* — Geoffrey S Evans
(74) *Attorney, Agent, or Firm* — Hoffman Warnick LLC; Ernest G. Cusick

(57) ABSTRACT

An electric discharge machining (EDM) device includes a circular blade, a motor coupled to the circular blade for rotating the circular blade, and an electric discharge control system operatively coupled to the circular blade and a workpiece. The electric discharge control system causes the rotating circular blade to cut the workpiece using electric discharge machining. The device allows for removal of large chunks of material using EDM, minimizing the number of cuts, time and energy required to create a part.

18 Claims, 12 Drawing Sheets

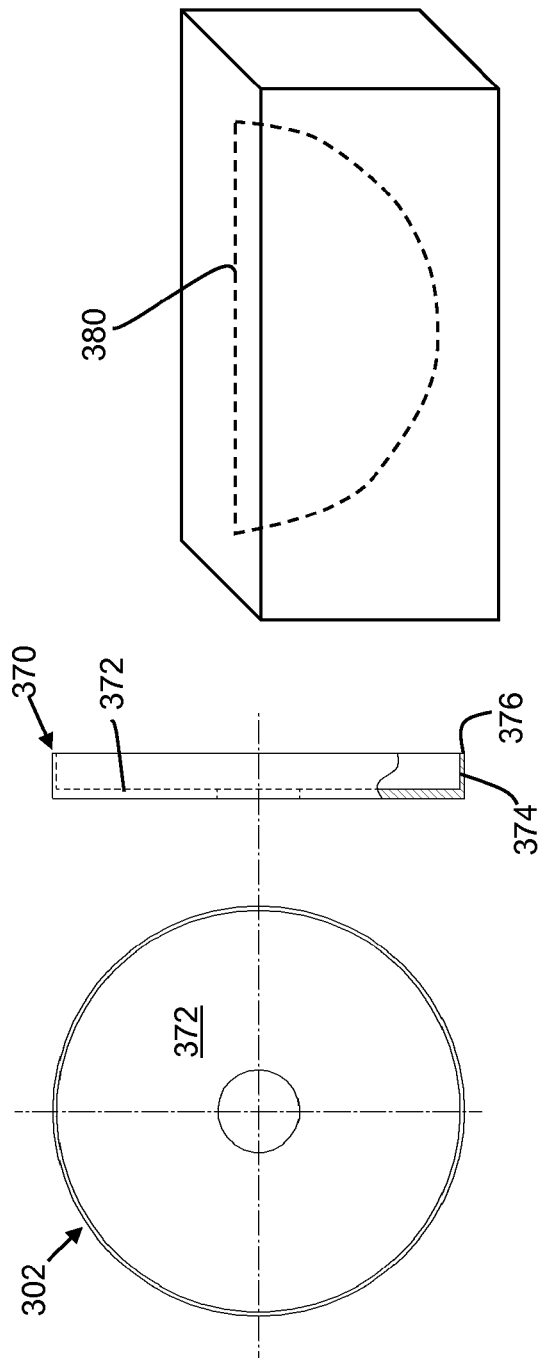
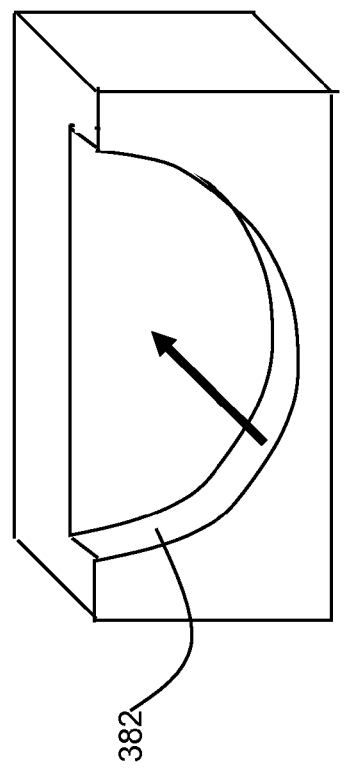
FIG. 4
FIG. 5A
FIG. 5B

ELECTRIC DISCHARGE MACHINING DEVICE USING ROTATING CIRCULAR BLADE

BACKGROUND OF THE INVENTION

The invention relates generally to electric discharge machining (EDM). More particularly, the invention relates to an EDM device using a rotating circular blade.

Machining difficult metals or alloys such as high resistive nickel alloys (e.g., Inconel) is an ongoing challenge for manufacturers. Conventional machining is difficult for these metals because they are harder and tougher than other alloys. Non-conventional approaches include laser machining, electrochemical machining, and electrical discharge machining, some of which are relatively slow, require large energy consumption and present other challenges. EDM die sinking has been used to make a variety of structures out of these materials in small volumes. EDM die sinking typically involves placing a workpiece into a tank of fluid such as hydrocarbon-based oil. A die electrode having a mirror image of the desired shape for the workpiece is driven by a ram into close proximity to the workpiece, and an electric pulse is then repetitively applied to the gap between the die electrode and workpiece to cause electric discharges that precisely remove material from the workpiece. EDM die sinking has the capability of machining difficult metals or alloys without high cutting force and hard tools, which makes the process cost efficient and less demanding than conventional machining techniques. Although EDM die sinking is an attractive process for machining these alloys, a number of challenges currently limit its use.

Some other EDM-based approaches employ a rotating grinding surface tool. One challenge with any of the EDM-based approaches is that they remove material in the form of particles, which makes the processes very slow. Wire-based EDM is also employed, but is incapable of forming some complex parts in 3-dimensional shapes, such as concave forms on an airfoil. The power input to a wire electrode is limited to prevent wire breakage, which limits the cutting speed to an unsatisfactory rate.

BRIEF DESCRIPTION OF THE INVENTION

A first aspect of the invention provides an electric discharge machining (EDM) device comprising: a circular blade; a motor coupled to the circular blade for rotating the circular blade; and an electric discharge control system operatively coupled to the circular blade and a workpiece, the electric discharge control system causing the rotating circular blade to cut the workpiece using electric discharge machining.

A second aspect of the invention provides an electric discharge machining (EDM) device comprising: a circular blade, the circular blade being substantially planar and having an outer circumferential edge; a motor coupled to the circular blade for rotating the circular blade; and an electric discharge control system operatively coupled to the circular blade and a workpiece, the electric discharge control system causing the outer circumferential edge of the rotating circular blade to cut the workpiece using electric discharge machining; and a universal movement system for moving one of the circular blade and the workpiece in three dimensions relative to the other.

BRIEF DESCRIPTION OF THE DRAWINGS

FIG. 4 shows a front view and a side view of a circular blade according to a third embodiment of the invention.

FIGS. 5A-5B show a perspective view of a workpiece machined using various embodiments of the circular blade.

DETAILED DESCRIPTION OF THE INVENTION

Figure 1:
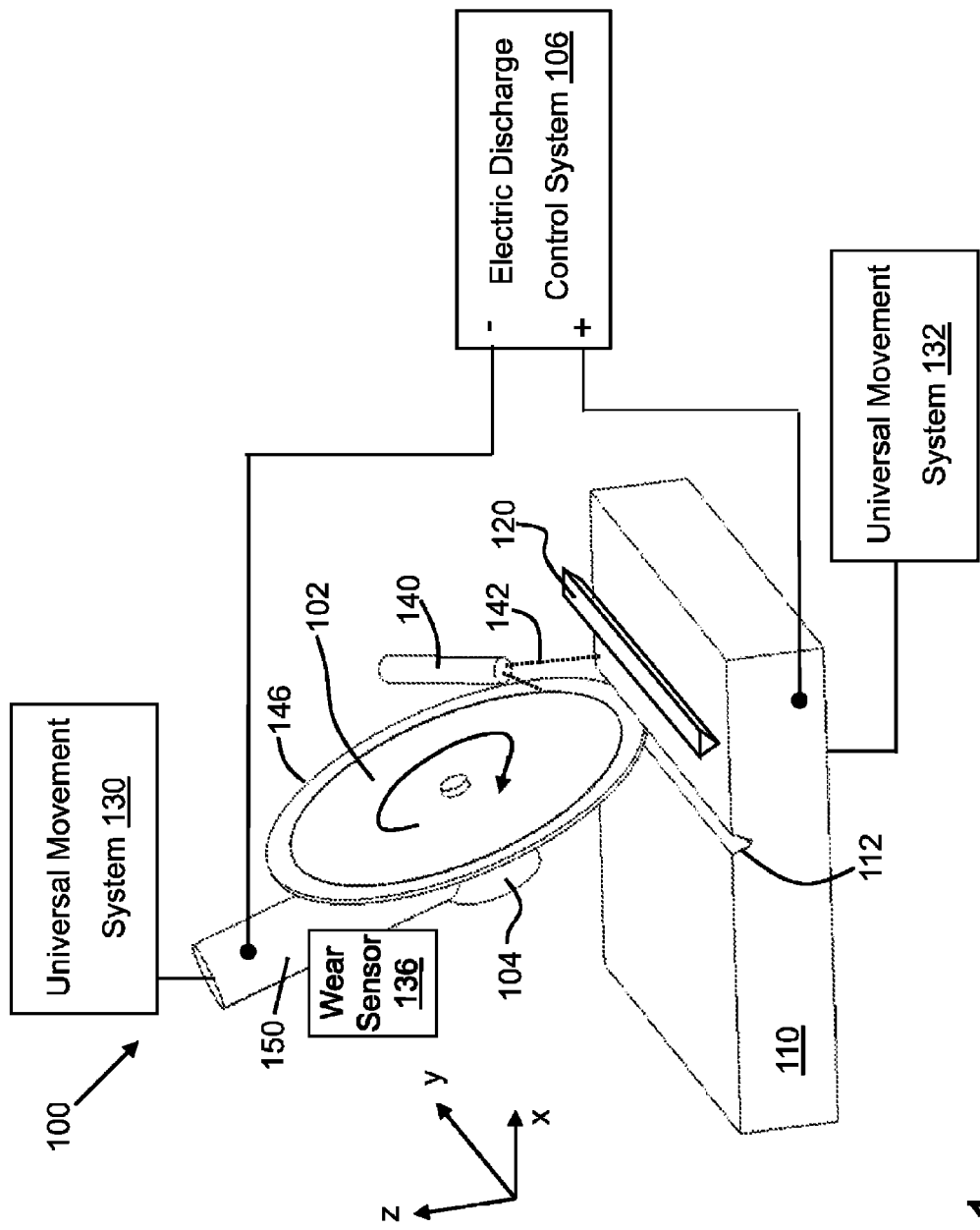
FIG. 1 shows a schematic diagram of an electric discharge machining (EDM) device using a circular blade in accordance with embodiments of the invention.

Referring to the drawings, FIG. 1 shows a schematic diagram of an electric discharge machining (EDM) device 100 according to embodiments of the invention. EDM device 100 includes a circular blade 102, a motor 104 coupled to circular blade 102 for rotating the blade, and an electric discharge control system 106 operatively coupled to circular blade 102 and a workpiece 110. Workpiece 110 may include any raw part to be shaped into a final product. For example, workpiece 110 may include a nickel-based alloy. As will be described herein, electric discharge control system 106 causes the rotating circular blade 102 to cut workpiece 110 using electric discharge machining, e.g., frequent electric discharges inside inter-electrode space between circular blade 102 and workpiece 110. More specifically, motor 104 causes circular blade 102 to rotate at a high rate of speed, e.g., greater than about 400 revolutions per minute. Simultaneously, electric discharge control system 106 causes an electric voltage/current having a negative polarity to be created in circular blade 102, and an electric voltage/current having a positive polarity to be created in workpiece 110. This polarity setting in conjunction with a machining fluid 142 (described elsewhere herein) causes short discharge pulses of shorter than about 3 microseconds. Control system 106 may also reverse this polarity setting, namely circular blade 102 connected to positive polarity and workpiece 110 to negative polarity, to fit oil dielectric and long discharge pulses of longer than 3 microseconds. As circular blade 102 rotates, electric discharges capable of removing material from workpiece 110 are created within a kerf or slot 112 formed by circular blade 102. That is, circular blade 102 forms a cut in the form of a kerf 112. Note, kerf 112 is illustrated after a V-shaped material section 120 has been removed after two kerfs have been made that meet. In this case, a chunk of material, i.e., V-shaped material section 120, is created rather than a split of workpiece 110 as in the conventional cutting process. Circular blade 102 is a conductive electrode with a smooth circumference. Material removal takes place in frequent electrical discharges at high temperature such that no mechanical cutting is involved.

EDM device 100 may also include a universal movement system 130 for moving circular blade 102 in three dimensions relative to workpiece 110, and/or a universal movement system 132 for moving workpiece 110 in three dimensions relative to rotating circular blade 102. In addition to translating motion, workpiece 110 can be turned around a fixed line or axis under the control of universal movement system 130. Universal movement system 130 can also tilt cutting blade 102 at a variable angle in reference to a surface of workpiece 110 to cut an oblique kerf into workpiece 110. Two opposite tilting cuts remove V-shaped material section 120 as shown in FIG. 1. While the cutting blade 102 moves along the y-axis, it may also be turned around the y-axis to make an inclination to a surface of workpiece 100. Also, a blade mount 150 can turn around the z-axis before making the inclination to the surface of workpiece 110, allowing workpiece 110 to move along a direction in an x-y plane parallel to rotating blade 102. Universal movement system(s) 130, 132 may include any now known or later developed systems under computer numerical control (CNC) having requisite motors, sensors, robotics, hardware/software, etc., for moving and turning circular blade 102 and/or workpiece 110 in three and more dimensions, i.e., 4 or more axis motion control is implemented to enable various cuts.

Circular blade 102 is consumed during operation. In order to prevent cutting depth reduction due to blade wear, a wear sensor 136 may be provided for detecting wear on the circular blade. Wear may take the form of the diameter of blade being diminished to an unsatisfactory dimension or other forms of damage, e.g., broken circumference, etc. Wear sensor 136 may take the form of any non-contacting sensor such as a laser, infra-red, induction, contacting, etc. Wear sensor 136 may be electrically coupled to universal movement system(s) 130, 132 such that movement of the blade and/or workpiece 110 can be adjusted to compensate for wear to blade 102. Similarly, wear sensor 136 may be electrically coupled to electric discharge control system 106 such that the voltage/current applied to circular blade 102 can be adjusted to compensate for wear to blade 102. For example, increased feeding of blade 102 into workpiece 110 may be provided to offset the otherwise reduced cutting depth.

EDM device 100 also includes a fluid nozzle(s) 140 for delivering a machining fluid 142, e.g., hydrocarbon-based oil or aqueous dielectric fluid, to an interface between rotating circular blade 102 and workpiece 110. As known in the art, machining fluid 142 acts to, among other things, remove particles of material removed from workpiece 110, cool workpiece 110 and circular blade 102, and provide a material to assist in creating the correct atmosphere, e.g., high temperature plasma, for electric discharge machining. Any appropriate pumping system may be employed to deliver machining fluid 142 to fluid nozzle(s) 140. Machining fluid 142 may be captured in a worktable and tank (not shown) below workpiece 110 for reuse. The used fluid is filtered to remove the micro particles and de-ionized in the case that machining fluid 142 includes an aqueous dielectric.

Figure 2:
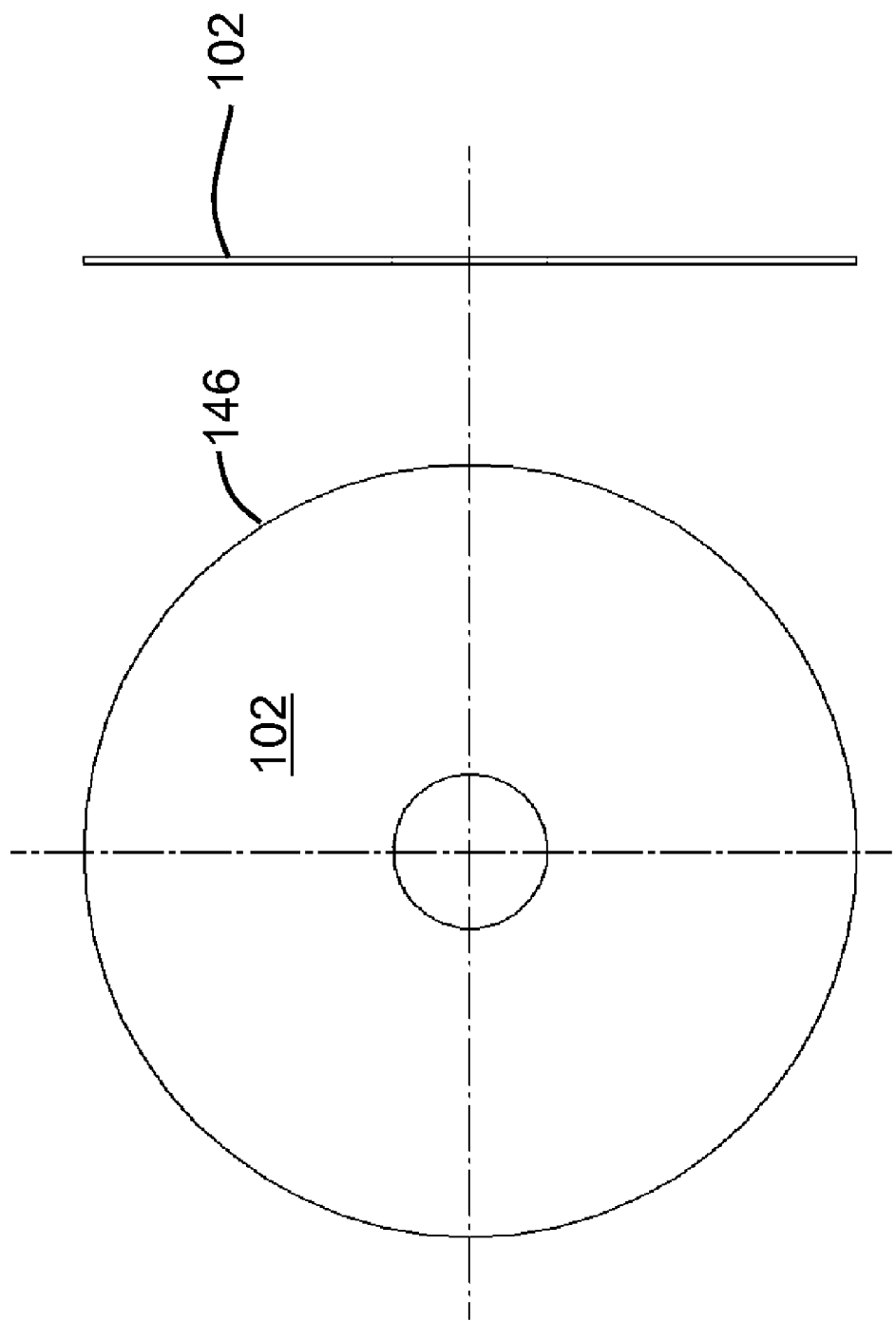
FIG. 2 shows a front view and a side view of a circular blade according to one embodiment of the invention.
Figure 3A:
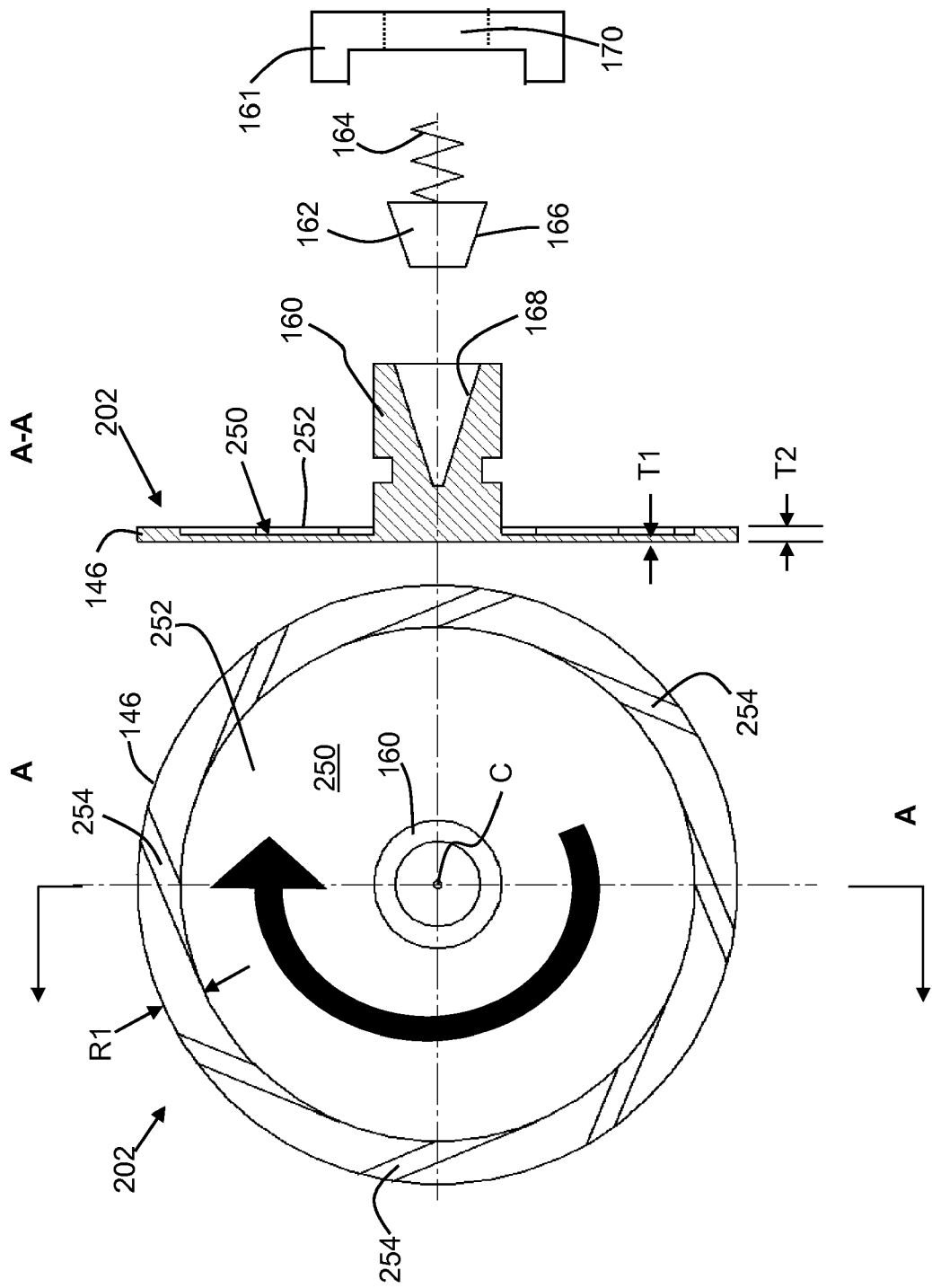
FIG. 3A shows a front view and a side view of a circular blade according to a second embodiment of the invention.
Figure 3B:
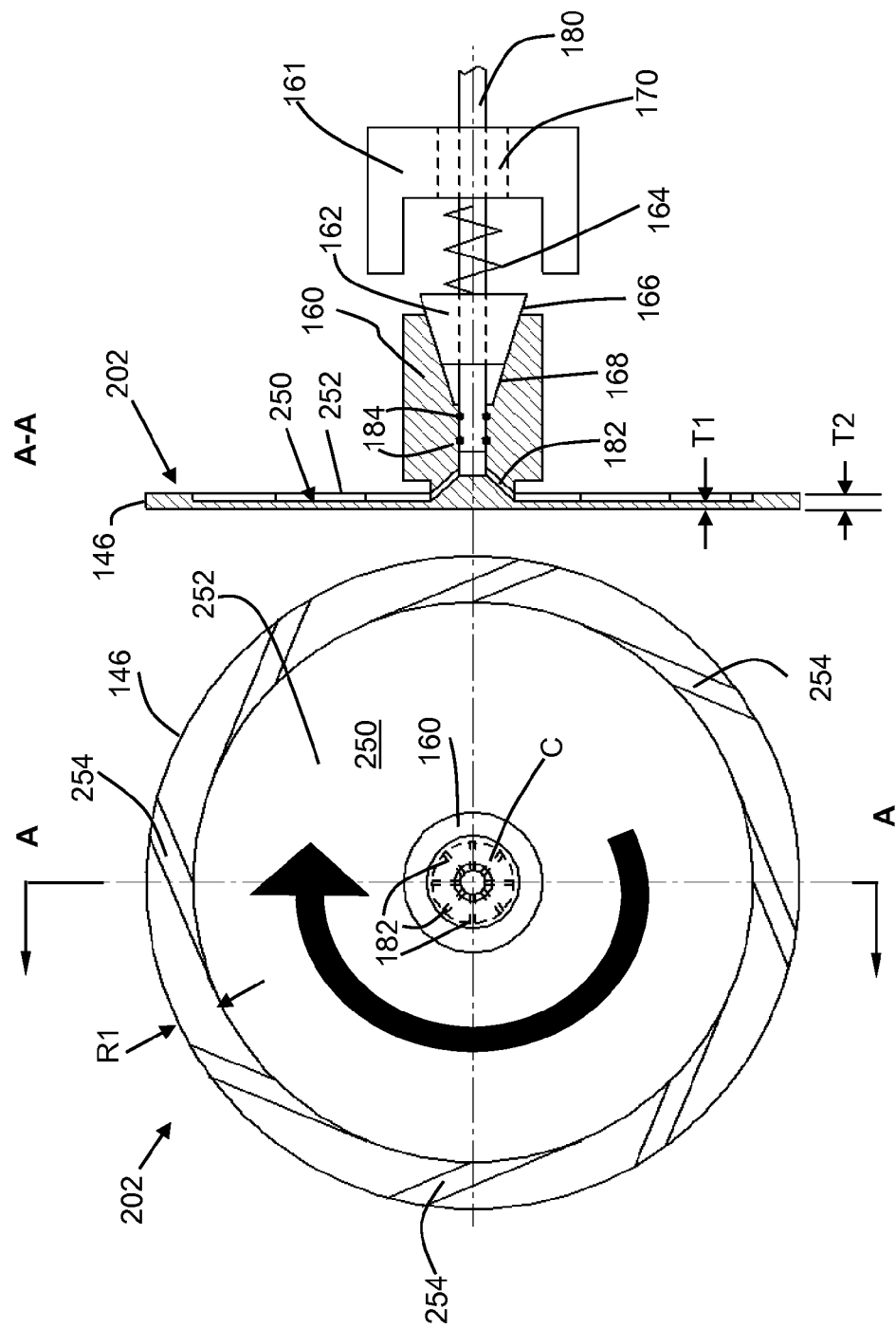
FIG. 3B shows a front view and a side view of a circular blade according to an alternative second embodiment of the invention.

As shown in FIGS. 1 and 2, in one embodiment, circular blade 102 is substantially planar and an outer circumferential edge 146 of circular blade 102 cuts workpiece 110. FIG. 2 shows both a front view (on left) and a side view (on right) of circular blade 102. FIGS. 3A and 3B both show a front view (on left) and a side view (in middle) of another embodiment of a circular blade 202. In this embodiment, circular blade 202 includes: a recess area 250 in a face 252 thereof. Recess area 250 has a first thickness T1 (middle FIGS. 3A-3B). Outer circumferential edge 146 has a radial extent R1 (left side FIGS. 3A-3B) and a second thickness T2 (middle FIGS. 3A-3B) that is greater than first thickness T1, thus forming recess area 250. A plurality of fluid passages 254 (left side FIGS. 3A-3B) may be provided that pass through outer circumferential edge 146 from recess area 250. Each of the plurality of fluid passages 254 may have first thickness T1. As also shown, each of the plurality of fluid passages 254 may extend non-radially relative to a center C of circular blade 202. It is understood, however, that fluid passages 254 may have a variety of different positions. In operation, when outer circumferential edge 146 is submerged in machining fluid 142 (FIG. 1) (e.g., a dielectric fluid) and circular blade 202 rotates clockwise, passages 254 drive fresh machining fluid 142 toward outer circumferential edge 146 to flush the discharging gap between circular blade 202 and workpiece 110. The drive force comes from the centrifugal effect of machining fluid 142 during high speed rotation, and machining fluid 142 comes from the recessed area 250. In alternative embodiments, outer circumferential edge 146 of circular blade 102 may be submerged in machining fluid 142.

FIG. 3A also shows a drive spindle 160 that is used to mechanically couple circular blade 202 with an output shaft 161 of motor 104 (FIG. 1). Output shaft 161 may fixedly couple to a periphery of drive spindle 160 in a known fashion. An electrical contactor 162 that is electrically coupled to electric discharge control system 106 (FIG. 1) mates with drive spindle 160 and conducts electrical current to center C of circular blade 202 to create electric discharges. Contactor 162 may be made from dense graphite or other consumable conductive materials. In the embodiment shown, drive spindle 160 includes an opening 168 having a tapered surface, e.g., a substantially convex, conical or frusto-conical shape. Contactor 162 has an exterior surface 166 for mating with the tapered surface of opening 168, e.g., a substantially conical or frusto-conical shape. Contactor 162 is not mechanically connected to drive spindle 160 and may be fixed through a center hole 170 of output shaft 161 of motor 104. In operation, contactor 162 contacts drive spindle 160 as the drive spindle rotates about it at a high speed. Contactor 162 is fixed to provide a static electrical connection with the power supply. Contactor 162 is positioned near center C of circular blade 202 to attain the lowest friction speed for minimal wear. The friction between the contactor's external surface and opening 168 in drive spindle 160 wears contactor 162. In order to address this situation, in addition to the tapered surfaces, contactor 162 may be biased by, for example, a spring 164 towards opening 168 to ensure continuous contact during operation. Thus, contactor 162 moves into opening 168 more as contactor 162 wears and becomes smaller, which maintains contact between drive spindle 160 and contactor 162 and extends contactor life. It is understood that while particular examples of mating tapered surfaces have been described to provide the above functions, other mating shapes may be possible. Further, any other structure capable of allowing circular blade rotation while delivering a current to the blade is considered within the scope of the invention. For example, drive spindle 160 and contactor 162 can also be mounted from the other side of circular blade 202 from that shown, which provides more space. In order to get more contact area for higher current capacity, two contactors 162 can be used, one on each side of blade 102.

In another alternative embodiment, as shown in FIG. 3B, machining fluid 142 (FIG. 1 only) may be supplied through a plurality of passages 182 extending through rotating drive spindle 160. Passages 182 extend from a center, static, fluid conduit 180 extending through drive spindle 160, contactor 162 and output shaft 161, through which machining fluid can be delivered to passages 182. Passages 182 may be circumferentially spaced within drive spindle 160. Sealing O-rings 184 may be inserted between static conduit 180 and drive spindle 160 to prevent fluid leakage to opening 168, where electrical contact is made. A nozzle 140 (FIG. 1) may also be applied to the FIGS. 3A-3B embodiments to add flushing strength externally. Although shown with the FIGS. 3A-3B embodiments of the circular blade, the teachings of FIGS. 3A-3B may also be employed with any other embodiment of circular blade described herein.

FIG. 4 shows another embodiment of a circular blade 302 in which the blade has a pan shape 370 with a substantially planar base 372 and a cylindrical rim 374 extending substantially perpendicularly from the planar base. In this fashion, a facing end edge 376 of cylindrical rim 374 cuts workpiece 110. FIGS. 5A-5B show an example application of circular blade 302. FIG. 5A shows a first cut 380 into a workpiece 110 using a circular blade 102, 202 (FIGS. 2 and 3, respectively) that is substantially planar. FIG. 5B shows a second cut 382 into the same workpiece using circular blade 302, which in this case removes a half-circle section from the workpiece. Although shown as meeting perfectly in FIGS. 5A-5B, some mis-alignment of the cuts may be permissible in some cases. Circular blade 302 allows the cutting to approach from any open workpiece sides including large cavity walls.

Any of the herein described circular blades 102, 202, 302 may be provided as part of a set of circular blades with each blade having a different diameter. In this fashion, different size cuts can be made.

Figure 7:
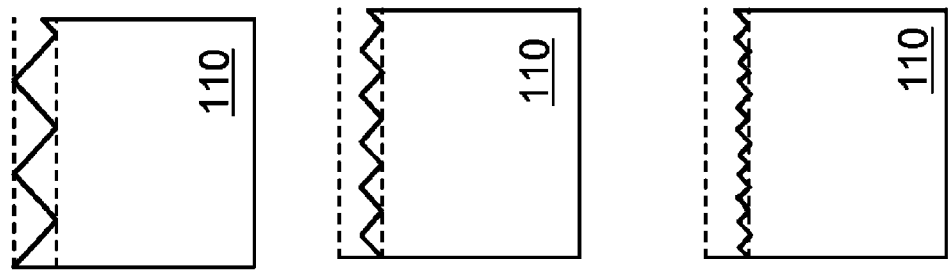
FIGS. 6-15 show various applications of the EDM device according to the invention.
Figure 6:
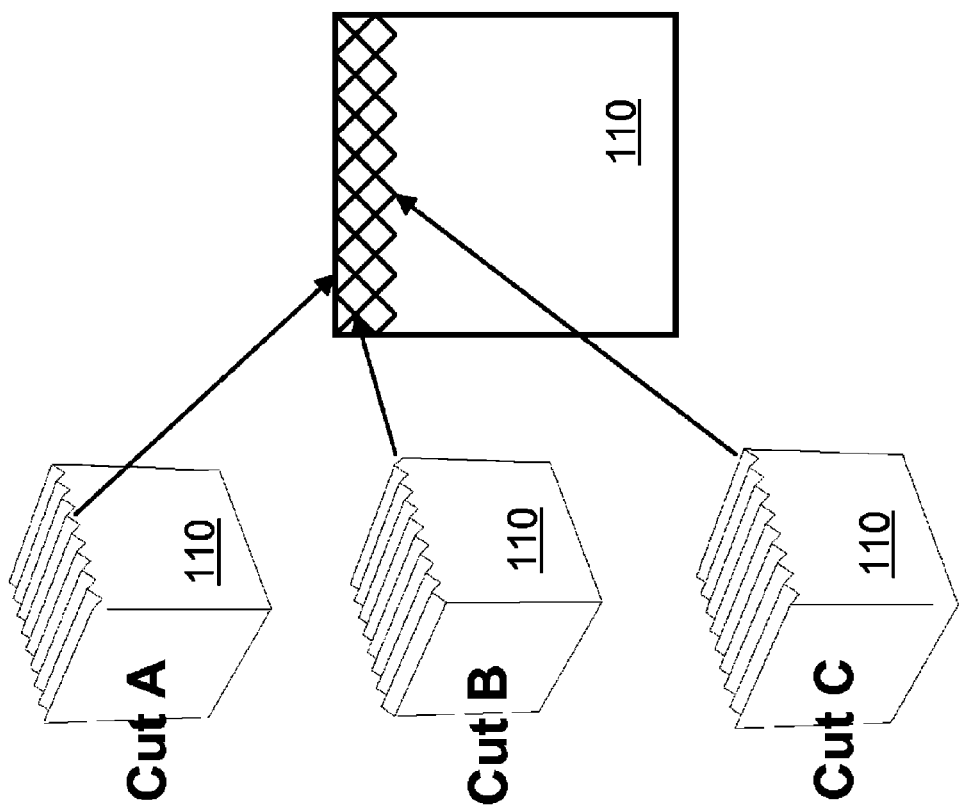

FIGS. 6-13 show various applications of circular blades 102, 202, 302. FIGS. 6-7 show how an EDM device 100 (FIG. 1) using a circular blade can be used to perform machining such as milling using repeated, meeting, angled cuts to gradually remove smaller and smaller sections of workpiece 110. FIG. 6 shows a different milling process using EDM device. Conventional EDM has to dissolve extra stock into micro particles. In contrast, EDM device 100 removes material in the form of larger chunks, creating a high removal rate with improved energy efficiency. Less energy is spent when the material is removed in larger chunks rather than micro particles. If the removed chunks are much thicker than cutting chips, such as those from mechanical milling or turning processes, the milling processes based on EDM are also faster and more efficient than the mechanical machining processes. If workpiece 110 is made from a superalloy such as Inconel, the advantage in metal removal rate is even more obvious because mechanical cutting becomes very difficult with these hard materials.

Figure 8:
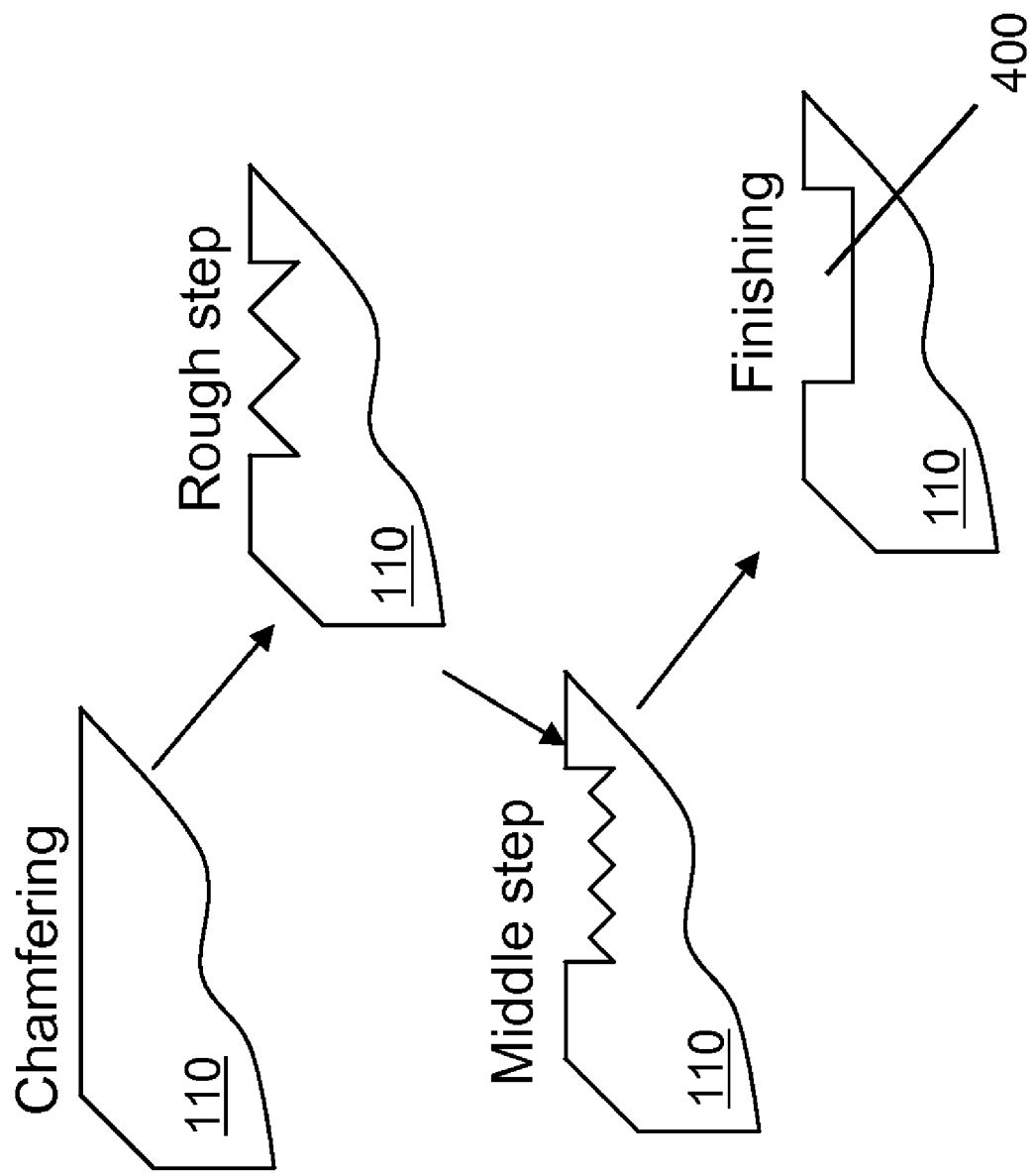

FIG. 7 illustrates an enhanced method from FIG. 6. Initially, large milling steps are taken to maximize the removal rate. Subsequently, the milling steps are gradually reduced as the target surface is approached to have a smoother surface closer to the final target surface. Note that these processes are for rough machining with the objective of high removal rate as well as high process efficiency. Finishing processes follows to reach the final surface requirements. FIG. 8 shows how EDM device 100 can be used to form a groove 400 in workpiece 110 using repeated, meeting, angled cuts to gradually remove smaller and smaller sections of workpiece 110. After the major stock is taken out by the new methods, the final finishing step may be performed by much slower conventional machining while the overall productivity and efficiency are still much higher. Note that EDM device 100 is not used to split the workpiece in half but remove extra metal as fast as possible.

Figure 10:
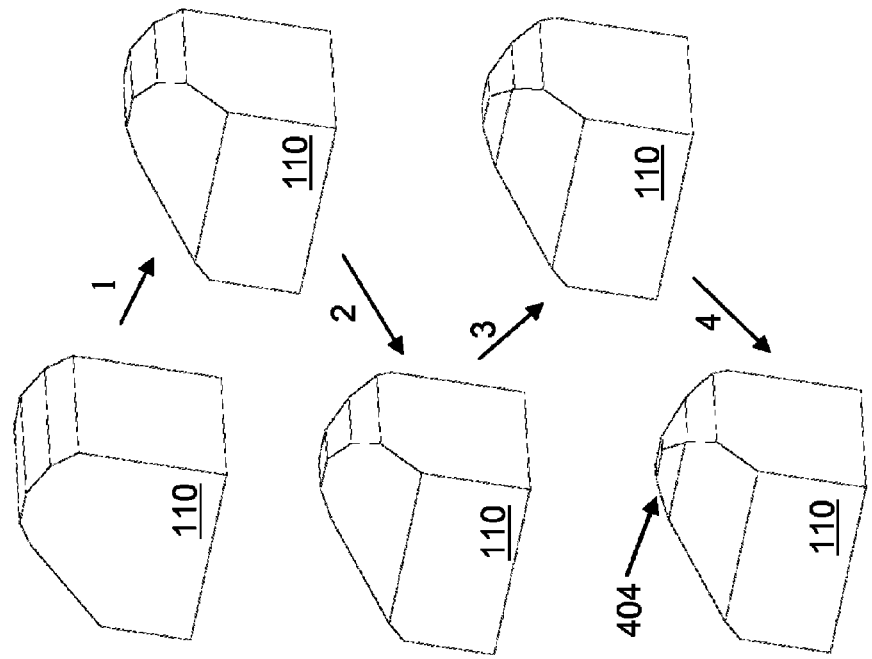
Figure 9:
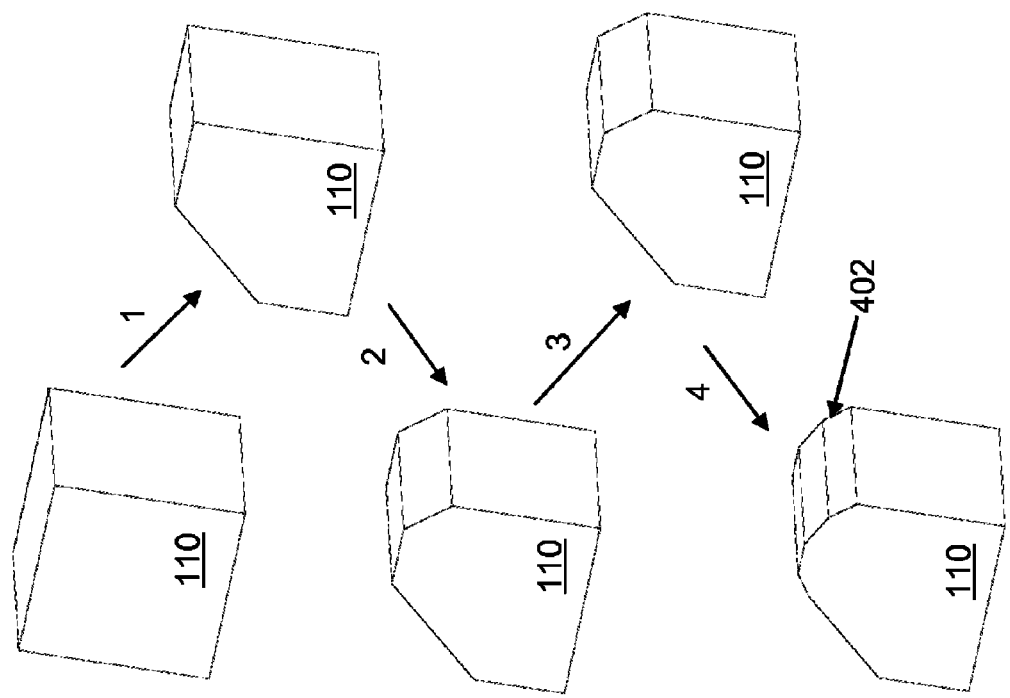

FIG. 9 shows how EDM device 100 and the above-shown method of material removal can be used to create a substantially curved surface 402 in a 2 dimensional space, and FIG. 10 shows how EDM device 100 can be used to change curved surface 402 to a substantially rounded surface 404 using repeated, angled cuts to quickly remove sections of workpiece 110. In this fashion, the curved surface becomes a more general three-dimensional surface. If conventional EDM is applied, the removed chunks have to be broken up into micro particles in a much slower process with higher energy consumption. In particular, conventional machining processes require the removed material to be broken up into many thin metal chips through more tool passes with higher energy consumption. Each surface 402, 404 may require conventional finishing machining which is much slower and less efficiency.

Figure 11:
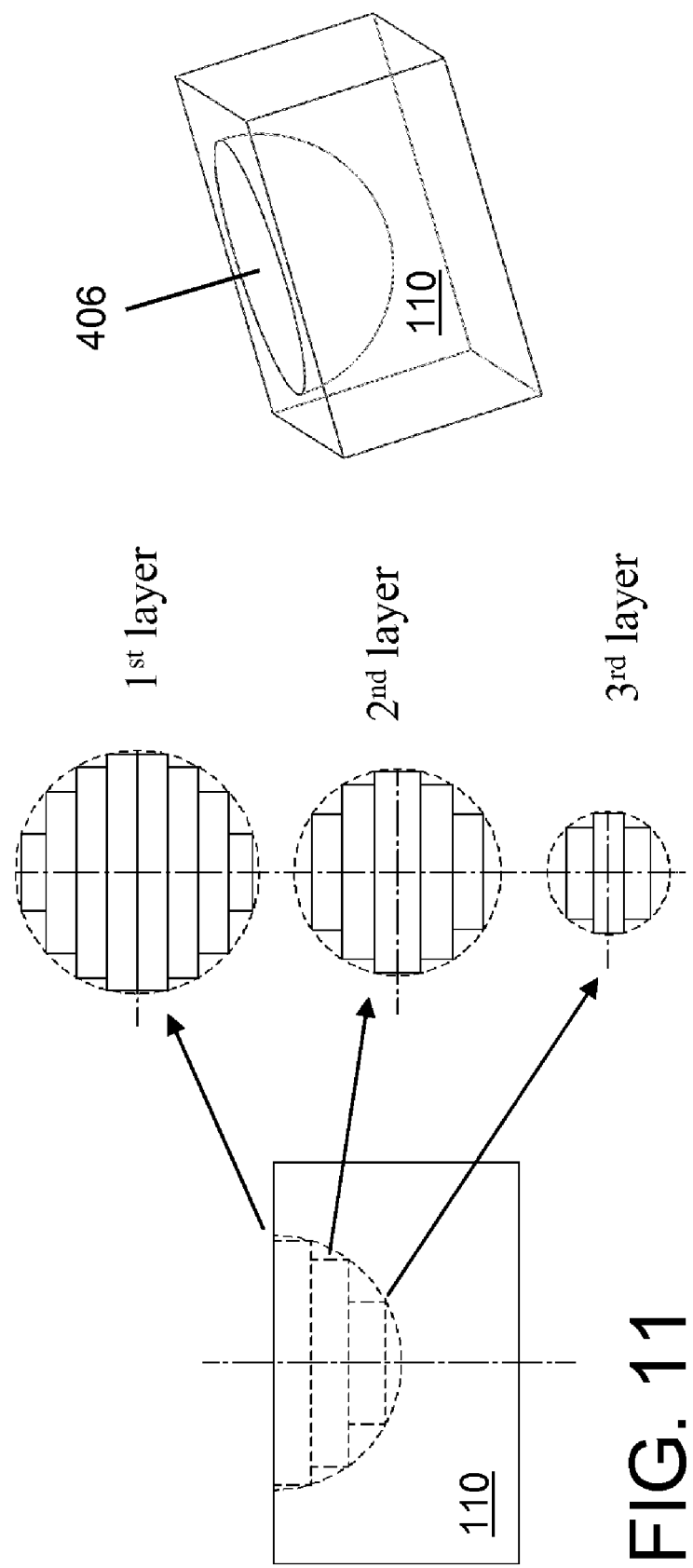
Figure 13:
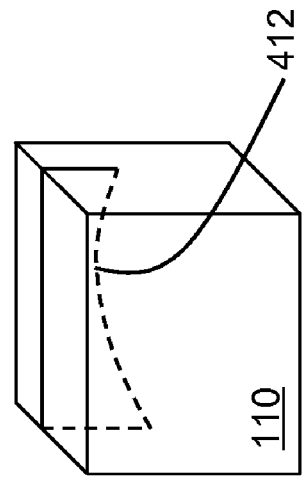
Figure 12:
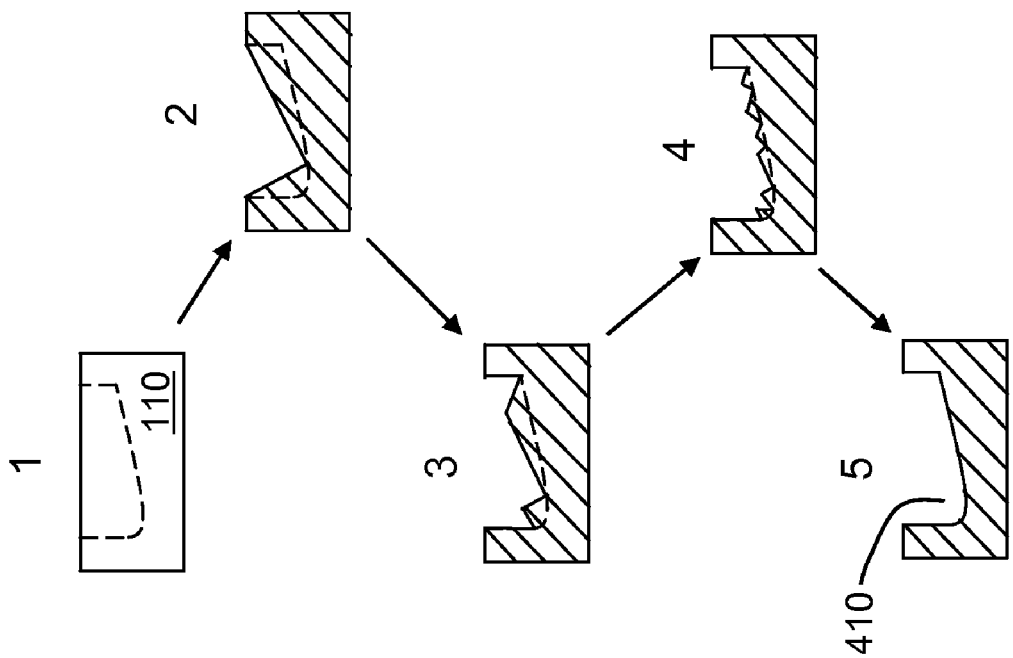

FIG. 11 shows how EDM device 100 can be used to repeatedly make progressively smaller adjacent slots in workpiece 110 to form a substantially, semispherical opening 406. This process requires progressively smaller circular blades to be used, with the smallest blade(s) fitting the bottom of semispherical cavity 406. FIG. 12 shows how EDM device 100 can be used to form a curved groove 410 in workpiece 110 using repeated, meeting, angled cuts to slowly remove smaller and smaller sections of workpiece 110. The final finishing step in that process may be performed by conventional machining. Again, EDM device 100 provides high material removal rate and efficiency with the usual finishing process to reach the target surface accurately. FIG. 13 shows how EDM device 100 can form a curved cut 412 using universal movement system(s) 130, 132 to direct the blade. Circular blade 102, 202 is not tilted in this case, i.e., it is perpendicular to workpiece 110; otherwise, variable cutting depth is not possible.

EDM device 100 can be used to create practically any complex part by fewer cuts or passes so as to generate a rough shape faster especially when the volume to be machined is large with hard workpiece materials. Three different kinds of cutting methods can be applied to adapt complex geometrical shapes, such as those of turbine bucket vanes, for maximum material removal. As shown in FIG. 13, a first method is straight cutting in which the blade is set perpendicular to the workpiece surface. The blade cuts straight down into the workpiece and then moves forward laterally along the blade side plane to form a kerf normal to workpiece surface. As the rotating blade moves forward, the cutting depth can vary to contour the target workpiece profile. As shown in FIG. 1, a second method is the tilt cutting in which the blade is tilted relative to the workpiece surface. Under the control of universal control system 130 and 132, circular blade 102, 202 cuts into the workpiece along the blade side plane. After the blade cuts a certain depth into the workpiece, the workpiece feeds straight towards the tilting and rotating blade to form a tilting kerf with constant depth. Cutting depth cannot change in this case.

As shown in FIG. 5, a third method includes side cutting in which circular blade 302 is used to cut into workpiece 110 from an open side. In this case, circular blade 302 rim can create an approximately concave workpiece surface profile. An optimal combination of these three methods is applied to remove extra material from the raw workpiece by using the least number of cuts and approaching the target workpiece as close as possible. Given the bar stock in rectangular or cylindrical form, the cutting combination and strategy are designed to remove the largest possible chunks without violating the workpiece boundary. Smaller chunks can be removed afterwards to approach the target boundary of the workpiece. Since these smaller cuts are slow, they can be reduced for high productivity. After the large material removal, a rough shape is formed for the subsequent finishing process, usually known arts. The smaller and smaller cuts can go on to approach closer and closer towards the final dimensions as long as they are still faster than the conventional finishing processes. Eventually, the conventional machining process becomes faster because of the ever-decreasing chunk or chip size. At this point, the methods described herein are stopped and conventional machining is implemented to finish the product.

Figure 14B:
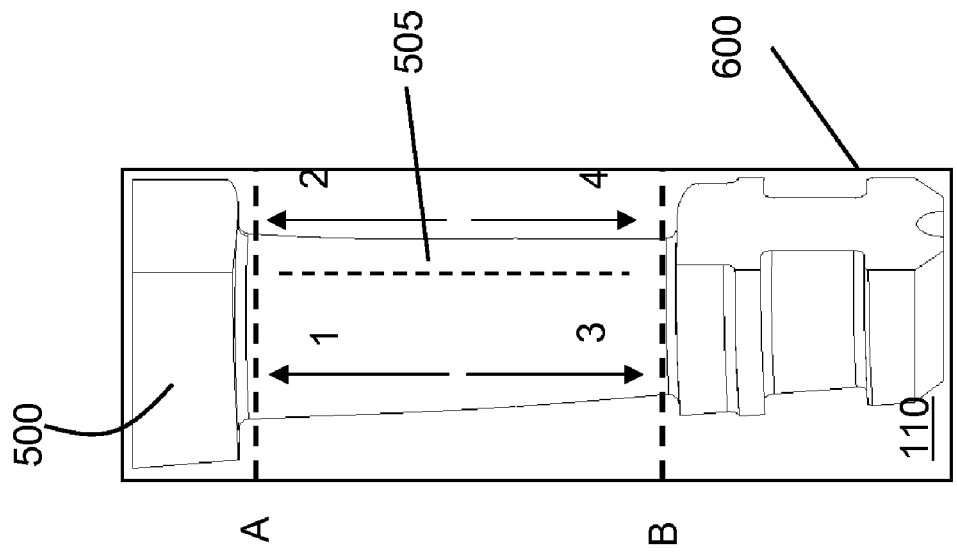
Figure 14A:
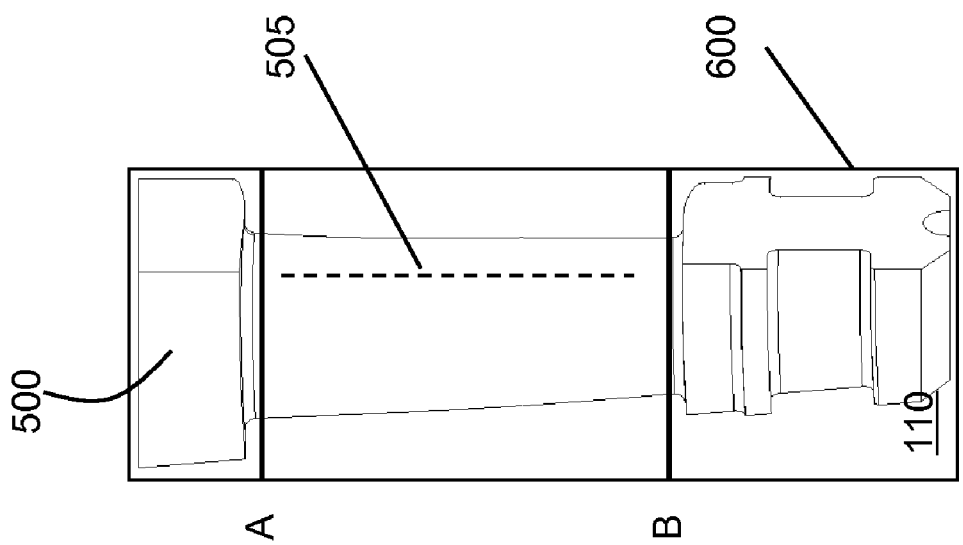
Figure 14D:
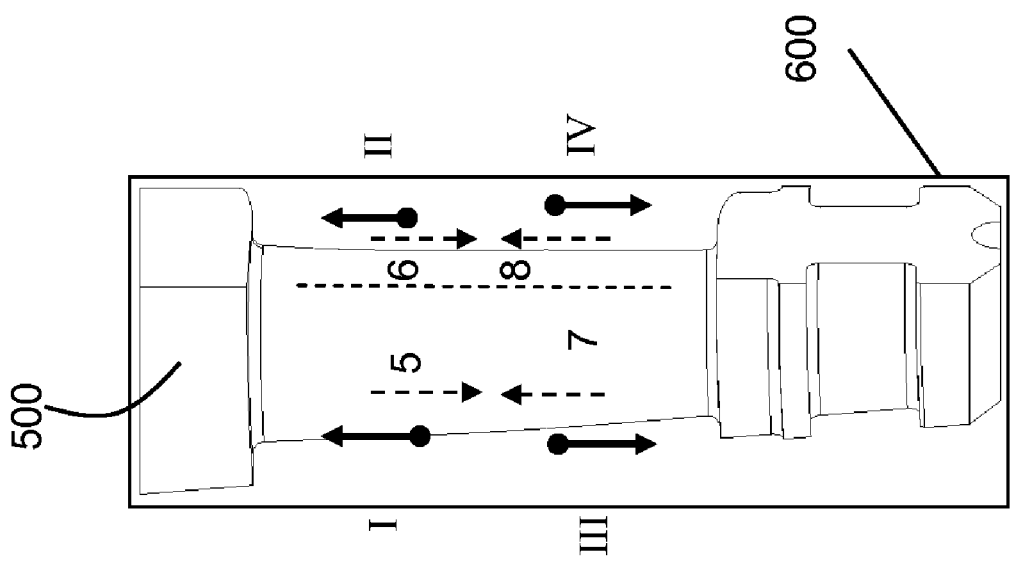
Figure 14C:
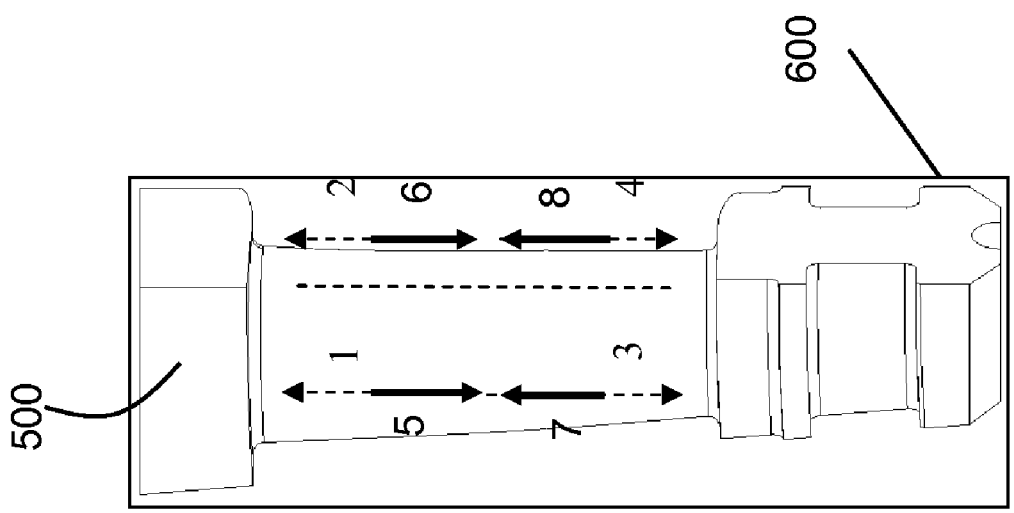

FIGS. 14A-14D illustrate formation of a turbine blade 500 (shown in lighter shading in the FIGS.) using a number of cuts using EDM device 100 and the cutting methods described herein. Workpiece 110 includes a bar stock in this illustration. Dash line 505 indicates a ridge on a convex side of the bucket vane. FIG. 14A shows two horizontal (as shown) straight cuts A, B partially into bar stock workpiece 110. The straight cuts vary cutting depth to contour the bottom profile on the vane. FIG. 14B shows four angled cuts 1-4 meeting with straight cuts A, B (FIG. 14A). The angled or tilted cuts 1 and 2 produce two bottom planes to meet the vertical side of cut A across ridge 505. On the other side, angled cuts 3 and 4 do the same to meet the vertical side of cut B across ridge 505. Cut 1 meets cut 2 above the vane ridge 505; also cut 3 meets cut 4 above ridge 505. 4 blocks of material are removed from workpiece 110. Next, FIG. 14C shows four more angled cuts 5, 6, 7 and 8 to remove more material in the middle section. The bottom plane from cut 5 meets that from cut 7 in the middle; the bottom plane from cut 6 meets that from cut 8 in the middle. Two more blocks of material are removed. At this point, a rough shape of convex airfoil is already produced for the further machining and finishing. FIG. 14D shows four more side cuts I, II, III and IV to flatten the ridges left behind by angled cuts 1-8. Cuts I, II, III, and IV are usually unnecessary but help to reduce the work of further machining and finishing.

Figure 15:
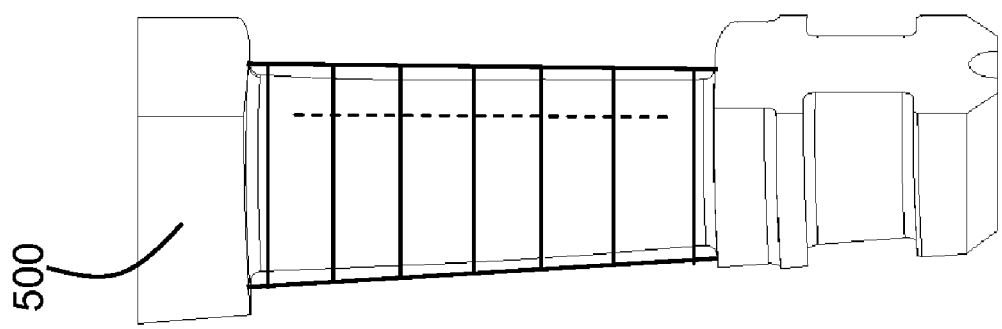

FIG. 15 shows the rough machined airfoil surface with a layer of allowance stock for further machining and/or finishing. The resultant surface, which is roughly and quickly produced after removing 8-10 blocks of metal, closely approximates the target airfoil surface. Using conventional processing, these blocks have to be cut into numerous thin chips, taking longer time and more energy. The lines left on the airfoil surface are the result of cuts A, B, I, II, III, and IV. The same strategy but perhaps with a different combination of cuts can be applied to the other sides of airfoil 500 as well as the dovetail and so on. Again, EDM device 100 removes large stock quickly and efficiently at the minimum expense of time and energy. Besides the necessary translating motion of workpiece 110 and blade mount 150, as shown in FIG. 1, turning workpiece 110 and mount 150 may also be required to set the workpiece and blade in a desirable coordination for these different cuts.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 wt %, or, more specifically, about 5 wt % to about 20 wt %", is inclusive of the endpoints and all intermediate values of the ranges of "about 5 wt % to about 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electric discharge machining (EDM) device comprising:
   a circular blade with an uninterrupted outer circumferential edge;
   a motor coupled to the circular blade, the motor configured to rotate the circular blade;
   an electric discharge control system operatively coupled to the circular blade and a workpiece,
   wherein the electric discharge control system causes the rotating circular blade to cut the workpiece at a speed greater than about 400 revolutions per minute using electric discharge machining; and
   a wear sensor electrically coupled to the electric discharge control system for detecting wear on the circular blade,
   wherein the wear sensor includes an infrared sensor, an induction sensor, a contacting sensor or a sensor including a laser.

2. The EDM device of claim 1, further comprising a universal movement system for tilting the circular blade at a variable angle in reference to a surface of the workpiece, and moving at least one of the circular blade or the workpiece in three dimensions relative to the other one of the circular blade or the workpiece.

3. The EDM device of claim 1, further comprising:
   a drive spindle for coupling the circular blade to the motor, the drive spindle including an opening having a tapered surface; and
   an electrical contactor electrically coupled to the electric discharge control system, the electrical contactor including an exterior surface for mating engagement with the tapered surface.

4. The EDM device of claim 1, wherein the motor includes a drive spindle coupled to the circular blade, and further comprising a conduit extending through the drive spindle for delivering machining fluid to the circular blade through a plurality of passages in the drive spindle.

5. The EDM device of claim 1, further comprising:
   a fluid nozzle for delivering a machining fluid to an interface between the rotating circular blade and the workpiece.

6. The EDM device of claim 1, wherein the circular blade is substantially planar and the uninterrupted outer circumferential edge of the circular blade cuts the workpiece.

7. The EDM device of claim 1, wherein the circular blade has a substantially planar base and a cylindrical rim extending substantially perpendicularly from the planar base, wherein a facing end edge of the cylindrical rim cuts the workpiece.

8. The EDM device of claim 1, wherein the circular blade includes a set of circular blades, each blade having a different diameter.

9. The EDM device of claim 1, wherein the circular blade includes:
   a recess area in a face thereof, the recess area having a first thickness which is less than a second thickness of the outer uninterrupted circumferential edge; and
   a plurality of fluid passages extending from the recess area to a circumferential face of the outer uninterrupted circumferential edge.

10. The EDM device of claim 9, wherein each of the plurality of fluid passages extends non-radially relative to a center of the circular blade.

11. The EDM device of claim 9, wherein each of the plurality of fluid passages has a depth substantially equal to the difference between the first thickness and the second thickness.

12. An electric discharge machining (EDM) device comprising:
- a circular blade, the circular blade being substantially planar and having an uninterrupted outer circumferential edge;
- a motor coupled to the circular blade, the motor configured to rotate the circular blade; and
- an electric discharge control system operatively coupled to the circular blade and a workpiece,
- wherein the electric discharge control system causes the uninterrupted outer circumferential edge of the rotating circular blade to cut the workpiece using electric discharge machining at a speed greater than about 400 revolutions per minute;
- a universal movement system for tilting the circular blade at a variable angle in reference to a surface of the workpiece, and moving one of the circular blade or the workpiece in three dimensions relative to the other one of the circular blade or the workpiece; and
- a wear sensor electrically coupled to at least one of the electric discharge control system or the universal movement system, the wear sensor for detecting wear on the circular blade:
- wherein the wear sensor includes an infrared sensor, an induction sensor, a contacting sensor or a sensor including a laser.

13. The EDM device of claim 12, wherein the universal movement system is adapted to adjust a position of the circular blade relative to the workpiece so as to form a set of kerfs in the workpiece, the set of kerfs dividing portions of the workpiece.

14. The EDM device of claim 12, wherein the circular blade includes a set of circular blades, each blade in the set of circular blades having a different diameter than each other blade in the set of circular blades.

15. The EDM device of claim 12, further comprising a fluid nozzle for delivering a machining fluid to an interface between the rotating circular blade and the workpiece.

16. The EDM device of claim 12, wherein the circular blade includes:
- a recess area in a face thereof, the recess area having a first thickness which is less than a second thickness of the outer uninterrupted circumferential edge; and
- a plurality of fluid passages extending from the recess area to a circumferential face of the outer uninterrupted circumferential edge.

17. The EDM device of claim 16, wherein each of the plurality of fluid passages has a depth substantially equal to the difference between the first thickness and the second thickness.

18. The EDM device of claim 16, wherein each of the plurality of fluid passages extends non-radially relative to a center of the circular blade.

* * * * *